United States Patent Office 3,557,596
Patented Jan. 26, 1971

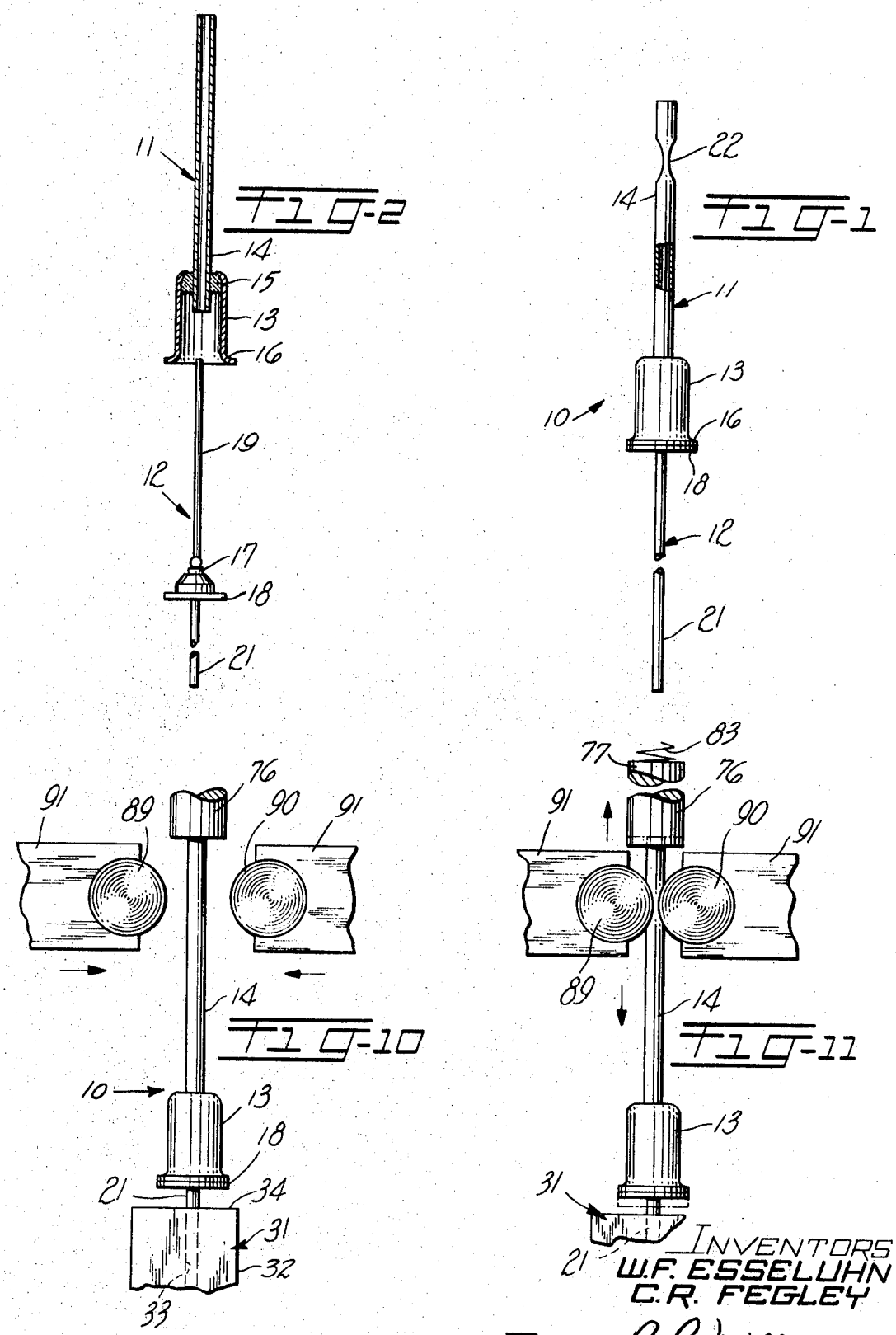

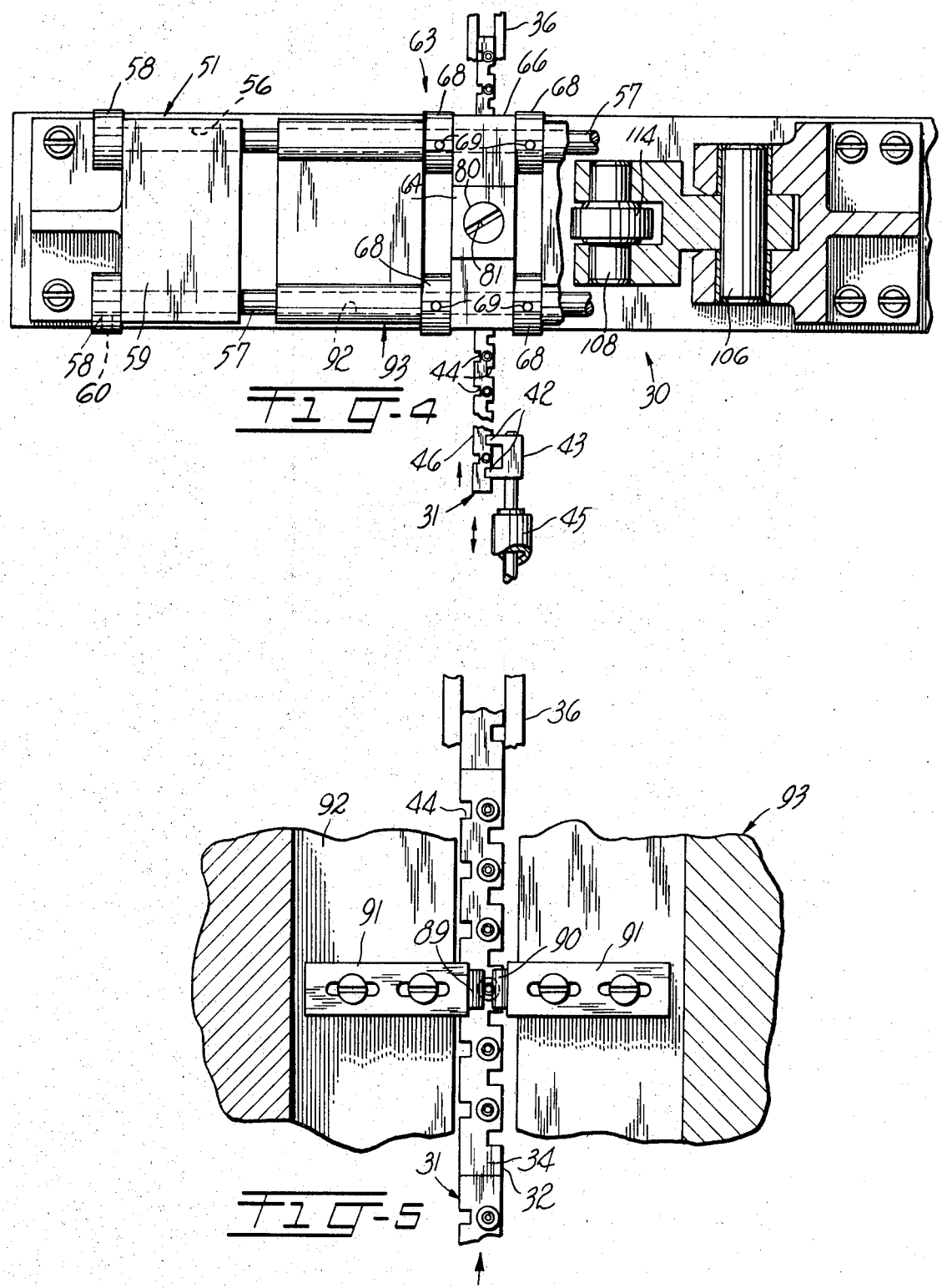

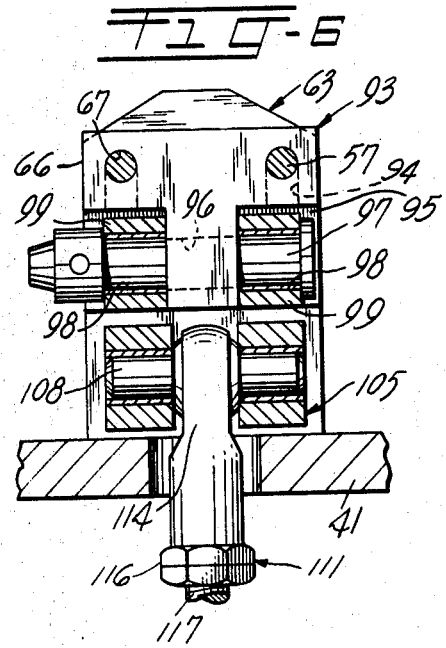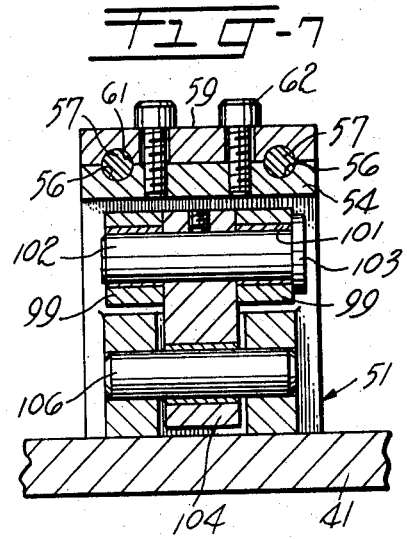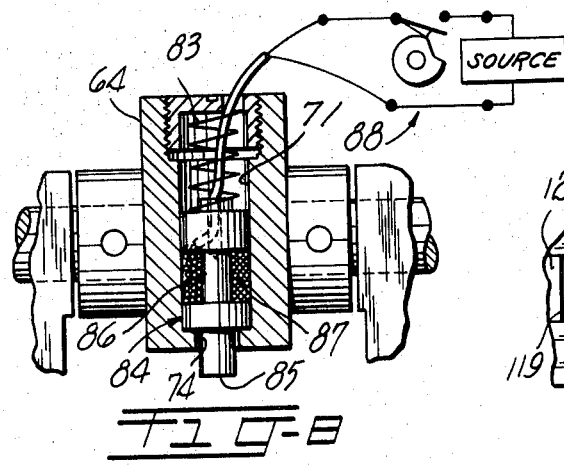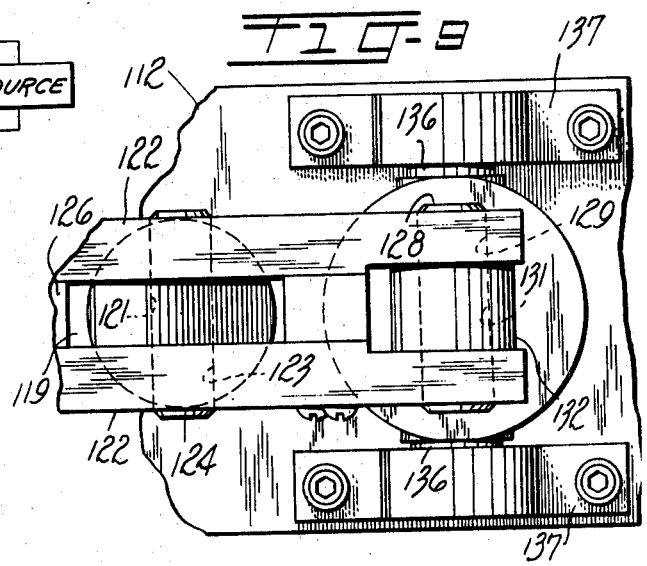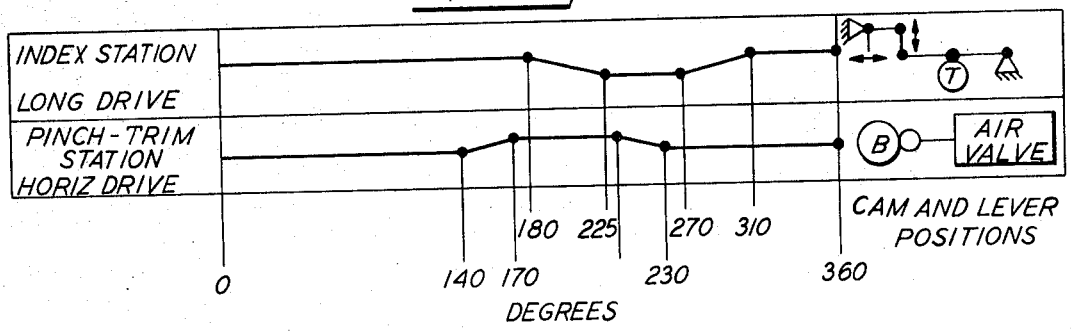

3,557,596
METHODS OF AND APPARATUS FOR SEALING A TUBULATION
Werner F. Esseluhn, Wyomissing, and Charles R. Fegley, Laureldale, Pa., assignors to Western Electric Company, Incorporated, New York, N.Y., a corporation of New York
Filed Mar. 18, 1968, Ser. No. 713,683
Int. Cl. B21d 14/04, 43/18
U.S. Cl. 72—367
16 Claims

ABSTRACT OF THE DISCLOSURE

Methods of and apparatus for sealing a tubulation extending upwardly from, and attached to, an article which is supported on a conveyor, in which a spring-load magnetic chuck attracts the free end of the tubulation and holds the article slightly above the conveyor. First and second opposed members are moved toward each other to pinch seal the tubulation with the axial elongation of the tubulation in opposite directions taken up by the magnetic chuck pushed upwardly against the spring and the article moving downwardly toward the conveyor.

BACKGROUND OF THE INVENTION

(1) Field of the invention

This invention relates to methods of and apparatus for sealing elongated, tubulated articles, and more particularly, to methods of and apparatus for sealing a tubulated article with provision for elongation in opposite directions along the longitudinal axis of the article.

(2) Description of the prior art

In the manufacture of miniature electrical components, the operating parts of the device are frequently enveloped in a container which is either evacuated or is filled with a particular atmosphere. It is necessary to seal the enveloping structure in these devices in order to preserve the vacuum or the particular atmosphere. This may be accomplished by structuring the envelope to have a tubulation appended there to, and then pinching off the tubulation.

Many times the tubulation is metallic and is formed of a relatively soft or malleable metal, such as copper or Kovar. Generally, the pinch-off operation is accomplished by using apparatus including a pair of opposed metal pinching rolls or peens which have been adapted to form a hermetic seal by collapsing or compressing the tubulation until the walls come together and are fused by cold welding in a vacuum-tight joint. Then, the excess portion of the tubulation beyond the joint is removed.

In practicing this art, it has been found that after sealing, the tubulation should be removed from the apparatus with a force directed axially along the longitudinal axis of the tubulation. If such care is not taken, stresses may be induced at the cold weld region of the pinch-off which could tear the walls of the tubulation and result in undesirable leaks. It has been customary to employ lifting devices to lift the article axially away from the peens after the pinch-off operation of the tubulation. However, it has been found that such apparatus introduces laterally directed stress into the article which weakens and tears the thin walls near the area of pinch-off.

This can either result in leakage during the manufacturing process of the article and necessitate reassembling the device with a new tubulation and a repetition of the subsequent operations, or it can result in a weakened seal which has a high probability of failure, thereby shortening the expected operating life. These possibilities of such enumerated difficulties seem to be greater for the larger and heavier devices in that the laterally directed stresses tend to be larger and more apt to damage the thin walled section on the area of pinch-off.

Another problem encountered in sealing off operations is that when the pinch rolls or peens are moved in toward one another and against the tubulation, the material of the tubulation tends to flow in each direction axially of the longitudinal axis of the tubulation from area of pinch-off. In order to avoid unduly large stresses in the walls of the tubulation, the article must be supported so as to be capable of expanding linearly in opposed directions along the longitudinal axis of the tubulation to absorb this movement.

There is currently in use some apparatuses designed to overcome this problem. For example, in some apparatuses, provision is made to support the tubulation in a nest so that the nest yields in a lower vertical direction as the peens seal. Moreover, the peens also move downwardly with the flow of material to stretch the plasticized portion of the tubulation and permit subsequent severance thereof. However, this approach requires very fine calibration in order to obtain the correct downward and simultaneous movement of the peens and nest.

In another apparatus, an expansible, contractile coupling is used to support one end of the tubulated article so that as the peens pinch off the tubulation, the coupling contracts to apply an axial force and pull the tubulation in a direction away from the pinch-off area. The extension of the coupling prior to pinch-off can be predetermined for both controlling the magnitude of the axial stresses and to compensate for any elongation of the tubulation. The tendency for the coupling to contract provides a uniform distribution of stresses and separates the pinched-off excess section of the tubulation from the remaining sealed section.

Problems may be encountered, however, in joining the flexible coupling to the open end of the tubulation and such a procedure would not seemingly be adapted to large scale production runs. There is still a need for, and it is an object of this invention to provide, a method of and apparatus for hermetically sealing an article by pinching off a tubulation joined to an article that may be readily adapted for production-type operations.

It is therefore an object of this invention to include in an apparatus for sealing a tubulation appended to a hollow article provision for absorbing the axial movement of the tubulation in opposed linear directions engendered by the expansive flow of material from the portion of the tubulation which is collapsed.

Moreover, it is an object of this invention to support a tubulated article during the sealing of the article by moving a pair of opposed pinch rolls or peens to collapse a selected portion of the tubulation so that the axial movement of the tubulation in opposed linear directions following collapsing of the walls thereof may be absorbed without damaging the article.

SUMMARY OF THE INVENTION

With these and other objects in mind, the present invention contemplates methods of and apparatus for attracting and lifting and then holding successive and spaced articles off a conveyor with a device which is resiliently mounted and for then collapsing a selected portion of the walls of a tubulation appended to each of the articles whereupon sections of the tubulation on each side of the portion collapsed move in opposed, linear directions and the resiliently mounted device is forcibly moved to absorb the movement of one section and the other section moves toward the conveyor.

More particularly, methods of sealing a tubulated article include the steps of conveying a plurality of successive, spaced, tubulated articles into a workstation whereat the tubulation of the leading article is attracted to lift the article and hold resiliently the article slightly above the conveyor. As the article is resiliently held, the walls of a selected portion of the tubulation are collapsed to seal the tubulation. As the material of the article flows in opposite directions from the portion collapsed, one section of the tubulation moves against the resilient mounting and the other section of the tubulation on the opposite side of the collapsed portion moves axially in an opposite direction toward the conveyor.

Apparatus is provided which includes a conveyor for advancing successively spaced articles, each of which has a tubulation appended thereto into a sealing station whereat the tubulation of the leading article is attracted to lift the article off the conveyor. The device which lifts each of the articles and holds the leading article above the conveyor is resiliently mounted. A pair of opposed pinch rolls or peens are moved toward each other to collapse the walls of a selected portion of the tubulation and thereupon seal the article. As the walls are collapsed and the material expands, the movement of a section of the tubulation on one side of the sealed portion is absorbed by the resiliently mounted lifting device and the section of the tubulation and article on the other side of the sealed portion move toward the conveyor.

BRIEF DESCRIPTION OF THE DRAWINGS

Other objects and advantages of the present invention will be apparent from the following detailed description when considered in conjunction with the accompanying drawings.

FIG. 1 is an elevational view, partially in section, of a completed diode assembly on which the principles of the methods of this invention are employed to collapse a selected portion of a tubulation appended to a diode case to seal the assembly;

FIG. 2 is an exploded elevational view, partially in section, and showing a case subassembly which is welded to a diode subassembly in order to manufacture the complete diode assembly shown in FIG. 1;

FIG. 4 is a plan view of the apparatus shown in FIG. 3;

FIG. 5 is a plan view taken along the lines 5—5 in FIG. 3 and showing mounting details of the sealing peens;

FIG. 6 is a view of the apparatus in FIG. 3 and taken along lines 6—6 thereof showing details of a portion of a drive mechanism for moving one of a pair of opposed carriages toward one another to engage and seal the tubulated article;

FIG. 7 is a view of the apparatus in FIG. 3 and taken along lines 7—7 thereof showing additional details of the drive chain for moving the other of the pair of opposed carriages;

FIG. 8 is a detail view of an alternative embodiment of the lifting and holding device shown in FIG. 3 which may be used to carry out the principles of the invention including an electromagnet for attracting and holding the tubulated articles;

FIG. 9 is a plan view of a portion of the underside of the apparatus in FIG. 3 as indicated by the lines 8—8 and showing a portion of an actuating mechanism for driving the opposed carriages toward one another;

FIG. 10 is a detail view showing a diode assembly in the work position attracted to a magnet and held off a workholder with a pair of opposed pinch rolls or peens mounted for movement into engagement with the tubulation of the article;

FIG. 11 is a detail view showing the pinch rolls moved into engagement with the diode assembly in FIG. 6 and with the magnet pushed upwardly against a resilient mounting and with the lower section of the tubulation and a casing moved downwardly toward the workholder; and FIG. 12 is a timing diagram showing the contours for a series of cams for operating the various component mechanisms.

DETAILED DESCRIPTION

Figure 3:
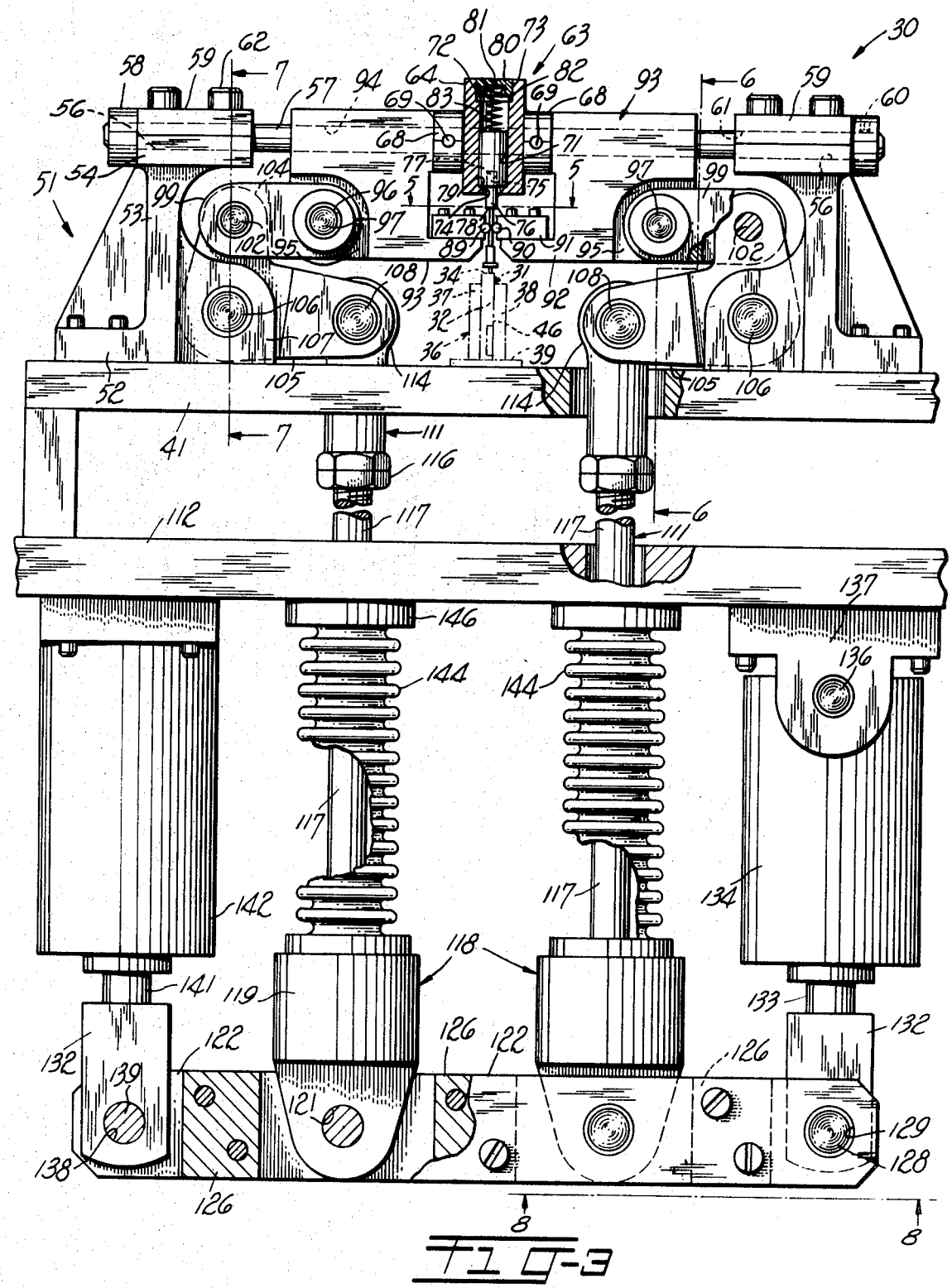
FIG. 3 is a side elevational view, partially in section, and showing an apparatus which may be used to practice the methods of this invention together with a conveyor for moving a plurality of the diode assemblies into a work position beneath a pair of pinch rolls or peens.

Referring now to FIG. 1, there is shown a perspective view of a sealed diode assembly 10. The diode assembly 10 comprises a case subassembly, designated generally by the numerals 11, assembled to a diode subassembly, designated generally by the numerals 12 (see exploded view in FIG. 2). The case assembly 11 comprises a diode casing 13 with a hollow, paramagnetic tubulation 14 extending from within a glass seal 15 in the casing and upwardly therefrom. The lower edge of the casing 13 is formed with a flange 16. The diode subassembly 12 comprises a semiconductor element 17 mounted on a platform 18 and having a gold lead 19 extending upwardly therefrom, and having a stud lead 21 extending downwardly from the platform.

The diode subassembly 12 is assembled to the casing subassembly 11 by welding the flange 16 to the platform 18. A final seal on the diode assembly 10 is accomplished by closing a selected, intermediate portion 22 of the tubulation 14 by a cold welding process (see FIG. 1). Closing the tubulation 14 by cold welding seals off the special inert atmosphere of the controlled ambient system around the enclosed semiconductor element 17 and completes an electrical connection between the tubulation 14 and the semiconductor element by trapping the soft gold wire lead 19 positioned within the tubulation in the cold welded seal.

In carrying out the principles of the method of this invention, an apparatus, such as that shown in FIG. 3 and designated generally by the numerals 30, may be employed. The apparatus 30 is adapted to receive and perform a sealing operation on individual diode assemblies 10 in predetermined arrays as supported in workholders, designated generally by the numerals 31.

Each of the workholders 31 comprises an elongated rack 32 having a plurality of openings 33 formed in a top surface 34 thereof (see FIGS. 5 and 10). Other operations are performed on the diode assemblies 10 at other workstations and then the diode assemblies in the rack workholder 31 are moved in seriatim to, and through, the apparatus 30 on a conveyor track, designated generally by the numerals 36 (see FIG. 3).

As illustrated in FIGS. 4 and 5, the diode assemblies 10 are moved with the stud lead 21 of each of the diode assemblies positioned in one of the openings 33 of the workholder 31 and with the platform portion 18 of the diode case subassembly 11 supported on the top surface 34 of the rack workholder 31. The workholders 31 serve the dual purpose of supporting the diode assemblies 10 with the tubulation 13 of each of the diode subassemblies oriented in a vertical direction and also of functioning as a lower electrode in a welding station whereat the flange or lip 16 of the casing 13 is welded to the platform 18 of the diode subassembly 12. The welding of the lip 16 of the casing 11 to the diode subassembly 12 is described in copending application Ser. No. 372,123 now United States Pat. No. 3,294,948.

The conveyor track, designated generally by the numerals 36, includes side guide plates 37 and 38 upstanding from and supported on a bed plate 39 (see FIG. 3). The conveyor track 36 and the apparatus 30 are supported generally on a base plate 41. A plurality of workholders 31 are received in the conveyor track and arranged in abutting end-to-end relation (see FIG. 5). The linear array of workholders is indexed along the track 36 by a pair of pawls 42 attached to a common slider 43 at an index station (see FIG. 4).

The workholders 31 are formed with a plurality of spaced, vertical slots 44 along each of two vertical sides 46 thereof. The pawls 42 engage slots 44 and are moved by an air-operated cylinder 45 toward the sealing apparatus 30 to index the workholder 31 at the index station toward the sealing apparatus. Since the workholders 31 are positioned end to end in the conveyor track 36, the indexing of the workholder 31 at the index station, which is in contact with the pawls 42, indexes all of the workholders toward or through the sealing apparatus 30 and positions, in seriatim, each of the diode assemblies 10 in registration with the sealing apparatus for the sealing operation.

Referring now to FIGS. 3 and 4, the apparatus 30 is shown to include a pair of identical, spaced and aligned stanchions, designated generally by the numerals 51, at the workstation for sealing the tubulations 14. The stanchions 51 are generally Z-shaped and have a base 52 supported on, and secured to, the base plate 41. An upright portion 53 is formed integrally with and connects a horizontal boss member 54 and the base 52 (see also FIG. 7). The horizontal member 54 has a pair of spaced grooves 56 formed therealong with the longitudinal axis of the grooves in a horizontal plane. The grooves 56 in the left-hand stanchion, as viewed in FIGS. 3 and 4, are aligned with, and spaced from, the longitudinal grooves in the right-hand stanchion.

As viewed in FIGS. 4 and 7, the aligned grooves 56 of the left-hand member and the right-hand members 54 on the stanchions 51 are adapted to receive a carriage rod 57. A collar 58 is mounted on the end of each of the carriage rods 57 and is secured thereto by a set screw 60. The collars 58, secured to the outer free ends of each of the rods 57, fixedly position the rod longitudinally within the aligned grooves 56. Moreover, a generally flat coverplate or strap 59, having a pair of spaced, parallel grooves 61 formed therein, is placed over each of the horizontal members 54 with the walls of the grooves 61 positioned over the top circumferential surfaces of the rods 57 (see FIGS. 3 and 7). Then the cover plate 59 is secured to the top, hoizontal boss 54 of the stanchion 51 with stud bolts 62 to further secure the carriage rods within the stanchion.

Midway between the right-hand and left-hand stanchions 51, as viewed in FIG. 3, a lifting and holding device, designated generally by the numerals 63, is fixedly mounted on the carriage rods 57. The lifting and holding device 63 includes a housing 64 (see FIGS. 3 and 4). The housing 64 has a generally U-shaped hanger 66 on each end thereof having an opening 67 adapted to be placed over and supported on one of the carriage rods 57 (see FIG. 6).

The lifting and holding device 63 is held in position on the carriage rods 57 and over the conveyor track 36 by a pair of spaced collars 68 on each of the carriage rods. Each of the collars 68 is placed adjacent one of the vertical faces of the housing 64 and secured to the carriage rods 57 by set screws 69. The collars 68 may be moved on the carriage rods 57 by loosening the set screw 69 to adjust the position of the housing 64 with respect to the conveyor track 36.

The housing 64 encloses a mechanism for lifting and holding one of the diode assemblies 10 off the workholder 31. The housing 64 has a cavity 71 formed therein with a slightly larger opening 72 joining the cavity 71 to a top surface 73 of the housing and a smaller passageway 74 connecting the cavity to the bottom of the housing (see FIG. 3).

A permanent magnet 76, having a cylindrical shape, is securely positioned in a bore 75 in a plug 77 which is concentrically disposed in the cavity 71 (see FIG. 3). A lower end 78 of the magnet 76 protrudes through the passageway 74 and downwardly toward the conveyor track 36. The lower end 78 of the magnet 76 is formed with a diameter substantially larger than the diameter of the tubulation 14 of the diode assembly 10. The plug 77 is supported on an annular surface 79 of the cavity 71.

The walls of the housing 64 about the opening 72 are threaded so that a cap 80, having a cleft 81 cut along a top surface thereof, may be threadably secured into the housing (see FIGS. 3 and 4). The cap 80 is formed with a recess 82 on the underside thereof to receive an upper end of a compression spring 83. The compression spring 83 is positioned in the cavity 71 so that the upper end thereof is received in the recess 82 and the lower end thereof is attached to the top end of the plug 77 to bias a lower end 78 of the magnet downwardly and out of the passageway 74. The length of the lower end 78 of the magnet 76 which protrudes below the bottom of the housing 64 maybe adjusted by turning the cap 80 clockwise, or counterclockwise, within the threaded opening 72.

It should be observed from the drawings (see FIGS. 3 and 4) that the magnet 76 is positioned with respect to the conveyor track 36 and the workholders 31 so that successive diode assemblies 10 are positioned in seriatim below, and in alignment with, the magnet.

When the workholders 31 are indexed to position a leading one of the successively mounted diode assemblies 10 in registration with the magnet 76, the magnet attracts the tubulation 14 of the leading diode assembly and lifts the diode assembly off the workholder. The permanent magnet 76 holds the diode assembly off the workholder until the tubulation 14 has been sealed.

It would be within the scope of this invention to use an electromagnet, designated generally by the numerals 84, instead of a permanent magnet (see FIG. 8). In the electromagnet 84, the plug 77 and magnet 76 are replaced with a pickup member 85 having the configuration shown in FIG. 8 and slidably disposed within the cavity 71 so that a lower portion of the pickup member protrudes through the passageway 74. The pickup member 85 has a necked-down portion 86 about which is wound a coil 87 that is connected to a circuit, designated generally by the numerals 88.

When the electromagnet 84 is actuated, the magnet will attract the tubulation 14 of the aligned diode assembly 10 and lift the diode assembly off the workholder 31. The electromagnet 84 will then hold the diode assembly 10 off the workholder until the tubulation 14 has been sealed, after which the magnet will be de-energized and the diode assembly released to reseat against the top surface 34 of the workholder 31.

In order to collapse a selected portion 22 of the walls of the tubulation 14 of a diode assembly 10 which is supported by the permanent magnet 76, a first pinch roll or peen 89 is included in the apparatus 30 and is aligned with, and cooperates with, a second opposed pinch roll or peen 90 (see FIGS. 3 and 5). Each of the pinch rolls 89 and 90 is held in a horizontally disposed and slidably adjustable chuck 91. The horizontally disposed chuck 91 is supported on a ledge-like portion 92 of a carriage, designated generally by the numerals 93. Each of the carriages 93 is supported on the carriage rods 57 with each of the carriage rods journalled in one of a pair of spaced and parallel bearing openings 94 formed through the carriage.

The carriages 93 are formed to have a recessed weblike portion 95 on that side of the brackets which is nearest the stanchions 51 (see FIG. 3). In describing the mounting of the carriages 93 on the carriage rods 57 and the drive mechanism for moving the carriages along the rods, reference will be made to only the left-hand carriage, as viewed in FIG. 3. The recessed portion 95 of the carriage 93 has a bore 96 formed therethrough to receive a pin 97 (see FIG. 6).

As is shown in FIGS. 3 and 6, the pin 97 extends past the bore 96 on each side of the carriage 93 and into an opening 98 in one end of a link 99 and is secured thereto. The other end of each of the links 99 at the left-hand end of the left-hand carriage 93, as viewed in FIG. 3, has an opening 101 therein which is aligned to receive a second pin 102 (see FIG. 7). The second pin 102, having a head 103, is inserted through the opening 101 in one of the links 99, then through an upper end 104 of a crank lever, designated generally by the numerals 105, and finally through the opening in the other link until the head 103 abuts one of the links (see FIGS. 3 and 7).

As shown in FIG. 3, the crank lever 105 is mounted pivotably on a pintle 106 supported between a pair of upstanding plates 107 mounted on the base plate 41. The other end of the crank lever 105 is bifurcated and is connected by a pin 108 to a toggle bar or push bar, designated generally by the numerals 111 (see FIG. 6). The toggle bar 111 extends below the base plate 41 and a bottom plate 112 of an enclosure (not shown) which houses the apparatus 30, as well as other apparatuses for performing other operations on the diode assembly 10 (see FIG. 3).

The toggle bar 111 has an eye 114 through which the pin 108 is mounted to join the toggle bar to the crank lever 105 (see FIGS. 3 and 6). The eye 114 has a threaded nut 116 on a lower end thereof into which is threadably turned an upper end of a push rod 117. The push rod extends through the opening in the bottom plate 112 of the enclosure and a lower end thereof is threadably turned into a connector member, designated generally by the numerals 118 (see FIG. 3).

A pin plate 119, having an opening 121 formed therethrough, extends vertically downward from the connector member 118. The pin plate 119 is inserted between a pair of spaced bars 122 to align the opening 121 with openings 123 in the spaced bars (see FIG. 9). A pin 124 is inserted through the opening 123 in one of the actuator bars 122, then through the opening 121 in the pin plate 119 and finally through the opening 123 in the other spaced bar to secure the pin plate to the bars. The bars 123 are maintained in spaced relationship by a plurality of spacer blocks 126 which are secured to each of the bars (see FIGS. 3 and 9).

Considering now the right-hand end of the actuator bars 122, as viewed in FIG. 3, an unheaded bolt 128 is inserted through aligned openings 129 in the ends of the actuator bars and through an opening 131 in a connector 132 (see FIG. 9). The connector 132 is joined to a lower end of a piston rod 133 which extends downwardly from an air cylinder 134. The air cylinder 134 is mounted pivotably in a pintle 136 which is supported in a clevis 137. The bearing plates are secured to the underside of the bottom plate 112 of the enclosure.

The left-hand ends of the bars 122, as viewed in FIG. 3, have aligned openings 138 formed therein for receiving a stud pin 139 which is also inserted through the opening 131 in another connector 132 identical to that at the right-hand ends of the actuator bars. The connector 132 at the left end is joined to a piston rod 141 extending from an air cylinder 142 that is fixedly attached to the underside of the bottom plate 112 of the enclosure.

As the air cylinders 134 and 142 are actuated to move the piston rods 133 and 141 downwardly, the actuator bars 122 are pushed downwardly to exert a pulling force on the toggle bars 111. By mounting one of the air cylinders, namely, the right-hand cylinder 134, as viewed in FIG. 3, pivotably, excessive wear on the air cylinders, as well as binding of the piston rods due to mistiming of the cylinders, is avoided.

It should be noted that it is very desirable to perform all of the operations on the diode assemblies 10 under controlled atmospheric conditions. Therefore, the enclosure for apparatuses which perform other manufacturing operations on the subassemblies is sealed. However, much of the operating mechanism, e.g., cams, shafts, etc., are located beneath the bottom plate 112. In order to connect the mechanisms above and below the base plate 41 without destroying the effectiveness of the controlled conditions within the enclosure 112, bellows 144 are used and are concentrically mounted, at least insofar as the apparatus 30 is concerned, about the toggle bars 111 and connected to a plate 146 which is secured to the underside of the bottom plate 112 and to the connector member 118 (see FIG. 3). In this way, as the toggle bars 111 move up and down, the bellows 144 merely contract or expand without exposing the enclosure to contaminants in the atmosphere.

OPERATION

In practicing the method of the present invention and in using the apparatus, designated generally by the numerals 30, a plurality of diode assemblies 10, having the case assemblies 11 welded to the diode subassemblies 12, are loaded into one of the rack workholders 31 so that the stud leads 21 are received in the openings 33 and the platform 18 is supported on the top surface 34 of the workholder. A plurality of workholders 31, which have been loaded with the diode assemblies 10, are placed in the conveyor track 36 between the side guide plates 37 and 38 and resting on the bed plate 39 (see FIGS. 3, 4 and 5).

An air cylinder 45 is actuated in accordance with the timing diagram, designated T and shown in FIG. 12, to move the common slider 43 (see FIG. 4). As the common slider 43 is moved, the pawls 42, which are joined to the common slider, and which are engaged with the spaced vertical slots 44 in one of the workholders 31, are also moved to advance the workholder 31. Since the workholders 31 are abutted end to end in the conveyor track 36, the movement of the pawls 42, and the workholder 31 engaged with the pawls, advances all of the workholders. Moreover, the stroke of the air cylinder 45 and the common slider 43 is dimensioned to position precisely each successive diode assembly 10 in registration with the magnet 76.

As a leading one of the diode assemblies 10 is advanced beneath and in registration with the permanent magnet 76, the magnet 76 is positioned close enough to the end of the tubulation to attract the tubulation 14 of the diode assembly and hold the top open end of the tubulation against the magnet (see FIG. 10). The attraction of the tubulation 76 lifts the diode assembly 10 off the workholder 31 and holds the diode assembly so that the platform 18 is at a predetermined distance above the workholder 31.

Then, in the next step of practicing the method of the invention, the air cylinders 134 and 142 are actuated to simultaneously move downwardly the piston rods 133 and 141, respectively (see cam B, FIG. 12). Since the piston rods 133 and 141 are connected to common, spaced actuator bars 122, the downward movement of the piston rods moves the actuator bars downwardly. As the actuator bars 122 are moved downwardly, the toggle bars 111 are pulled along therewith, causing the bellows 144 to expand.

The downward movement of the left-hand toggle bar 111, as viewed in FIG. 3, exerts a force on the pin 108 to rotate the crank lever 105 in a clockwise direction, as viewed in FIG. 3. Similarly, the simultaneous downward movement of the right-hand toggle bar 111 rotates the right-hand crank lever 105 in a counterclockwise direction, as viewed in FIG. 3. As the left-hand crank lever 105 is rotated in the clockwise direction, the upper end 104 of the crank lever exerts a horizontal force component through the pin 102 on the link 99 to move the link horizontally against the pin 97.

The horizontal force component exerted by the links 99 against the pins 97 urges the left-hand carriage 93, as viewed in FIG. 3, to the right and the right-hand carriage to the left and toward the left-hand carriage. In this way, the opposed pinch rolls 89 and 90 are moved toward each other and into engagement with the selected portion 22 of the tubulation 14 (see FIG. 11). Further movement of the opposed pinch rolls 89 and 90 toward each other peens and collapses the walls of the tubulation 14 and cold welds the material to seal the diode assembly 10.

As the walls of the tubulation 14 are collapsed, the sections of the tubulation on each side of the selected portion 22 tend to expand, with the section above the selected portion moving upwardly along the longitudinal axis of the tubulation. Similarly, the lower section of the tubulation moves downwardly away from the pinch rolls 89 and 90 to move the casing 13 toward the top surface 34 of the workholder 31.

The upward movement of the tubulation 14 above the selected portion 22 exerts a vertical force component against the magnet 76. The expansive force of the tubulation 14 against the magnet 76 urges the plug 77 against the spring 83 and overcomes the downward biasing of the spring to move the magnet and plug upwardly within the cavity 71 in the housing 64. As the magnet 76 moves upwardly within the cavity 71 in the housing 64, the spring 83 is compressed. In this way, the upward linear expansion of the section of the tubulation 14 above the portion 22 is permitted without unduly stressing the tubulation.

Then the air cylinders 134 and 142 are actuated to move the piston rods 133 and 141 upwardly into the air cylinders and thereupon pull the spaced actuator bars 122 upwardly. The upward movement of the actuator bars 122 forces the toggle bars 111 upwardly through the openings in the bottom plate 112 of the enclosure. Also, as the toggle bars 111 are pulled vertically upward, the bellows 144 contract to a normally closed position.

The toggle bars 111 exert an upward force component through the pins 108 against the crank levers 105 to rotate the left-hand work lever, as viewed in FIG. 3, in a counterclockwise direction and the right-hand crank lever in a clockwise direction. The rotation of the left- and right-hand crank levers 105 in a counterclockwise and a clockwise direction about the pintles 106, respectively, as viewed in FIG. 3, moves the links 99 and, hence, the left-hand carriage 93 to the left and the right-hand carriage to the right to move the carriages away from each other. As the carriages 93 are moved apart from each other, the pinch rolls 89 and 90 are moved out of contact with the collapsed walls of the tubulation 14 at the selected portion 22.

The workholder 31 is then indexed to position the next successive diode assembly 10 beneath and in registration with the permanent magnet 76 and to move the sealed diode assembly along the conveyor track 36. As the workholder 31 is indexed by the activation of the air cylinder 45 and the pawls 42, the upper end of the tubulation is slidably moved along the underside of the lower end 78 of the magnet 76 until the tubulation is moved out of contact with and out of the field of the magnet. The diode assembly 10 is thereupon released to reseat the platform 18 on the top surface 34 of the workholder 31. The portion of the tubulation 14 above the collapsed, selected portion 22 is flicked off at a subsequent station.

As mentioned hereinbefore, the electromagnet 84 is used, then, simultaneously with the movement of the pinch rolls 89 and 90 out of engagement with the tubulation 14, the magnet is deenergized to release the tubulation 14 and permit the sealed diode assembly 10 to drop back toward and reseat the casing against the top surface 34 of the workholder 31.

It is to be understood that the above-identified embodiments are simply illustrative of the principles of the invention and numerous other modifications may be devised without departing from the spirit and scope of the invention.

What is claimed is:

1. In a method of deforming an elongated article, the steps of:
   supporting one end of said article for movement in an upward vertical direction while the other end is free to move in a downward vertical direction; and
   deforming said article at a location intermediate said ends to flow portions of said article on one side of the location in the upward vertical direction and on the other side in the downward vertical direction.

2. In a method of sealing a tubulated article mounted on a workholder, the steps of:
   attracting and yieldingly supporting said article along an upper portion thereof above said workholder; and
   collapsing a selected portion of the walls of the tubulation to seal said article and to move opposed sections of the tubulation in substantially opposed linear directions from the selected portion.

3. At a workstation having a pair of pinch rolls movably mounted below a resiliently mounted pickup, a method of sealing a tubulation appended to each of a plurality of casings supported on a workholder, comprising the steps of:
   moving said workholder into said workstation to position successively individual casings beneath said pinch rolls and to align each of said tubulations with said pickup;
   actuating said pickup to attract the tubulation in the workstation and to partially withdraw said casing from said workholder;
   pinching off said tubulation between said rolls to expand the material in the area of pinch-off in linearly opposed directions along the axis of said tubulation and the upward movement of the tubulation above the area of pinch-off is absorbed by the resiliently mounted pickup while the tubulation, below the area of pinch-off, and the casing move toward said workholder; and
   moving said workholder from said workstation to move said partially withdrawn casing from said pickup.

4. At a workstation a method of sealing a casing having a paramagnetic tubulation appended thereto as set forth in claim 3 wherein said partial attraction is accomplished by magnetically attracting and holding said tubulation.

5. At a workstation having a pair of pinch rolls movably mounted below a resiliently mounted magnetic pickup, a method of sealing a paramagnetic tubulation appended to each of a plurality of casings supported on a workholder, comprising the steps of:
   incrementally advancing said workholder into said workstation to position successively a leading one of said individual casings beneath said pinch rolls and to align each of said tubulations with said pickup, whereupon said magnetic pickup attracts each successive leading tubulation and holds said casing above said workholder;
   pinching off said tubulation between said pinch rolls to expand the material in the area of pinch-off, in linearly opposed directions along the axis of said tubulation and the upward movement of the tubulation above the area of pinch-off is absorbed by the resiliently mounted pickup while the tubulation, below the area of pinch-off, and the casing move toward said workholder; and
   further advancing said workholder to move said leading one of said casings out of said workstation thereupon sliding said tubulation off said magnetic pickup and moving the next successive casing into said workstation.

6. In an apparatus for sealing an article having a tubulation extending therefrom at a workstation;
   means supporting said article at said workstation for axial movement of said tubulation in opposed, linear directions; and
   means for pinching off said tubulation at a predetermined location to seal said article whereupon the tubulation on opposite sides of said location moves in said opposed, linear directions.

7. In a metal working apparatus;
   means for supporting an article to be worked;

means mounting said supporting means for movement;
means for urging said supporting means against said mounting means;
means for engaging and deforming the supported article to move undeformed sections of the article in opposite directions and to move said supporting means away from said mounting means.

8. In an apparatus for sealing an article having a tubulation extending from a casing at a workstation;
means for conveying individually and successively a plurality of articles to said workstation;
means at said workstation for attracting and holding a leading one of said articles above said conveying means;
means for resiliently mounting said attracting and holding means to allow axial movement of said holding means; and
means for pinching off said tubulation to seal said article whereupon the axial elongation of said tubulation is imparted against said resiliently mounted attracting means in an upward direction and moves the casing in a downward direction toward said conveying means.

9. In an apparatus for sealing an article having a tubulation extending from a casing by pinching off the tubulation at a workstation;
a workholder having a plurality of nests for receiving a plurality of said articles with said casings supported on a top surface thereof and said tubulation extending upwardly therefrom;
means for conveying a plurality of said workholders successively to said workstation to position, in seriatim, each of said articles in alignment with said workstation;
means resiliently mounted at said workstation for attracting said article off said conveyor and for holding said article above said conveyor; and
means moved into engagement with said tubulation for pinching said tubulation to seal said article whereupon the axial elongational movement of said tubulation is absorbed by an upward movement of said resiliently mounted holding means and the simultaneous downward movement of said casing.

10. In an apparatus for sealing an article having a tubulation extending from a casing by pinching off the tubulation at a workstation as set forth in claim 9, wherein said means for pinching said tubulation includes:
a pair of opposed pinch rolls mounted for movement toward one another and into engagement with diametrically opposed points on the periphery of said tubulation; and
means operable upon conveying said workholders to said workstation and upon lifting said articles out of said workholder for moving said pinch rolls into engagement with said tubulation.

11. In an apparatus for sealing an article having a paramagnetic tubulation extending from a casing by pinching off the tubulation at a workstation as set forth in claim 9, wherein said resiliently mounted means for attracting and holding said article includes:
magnetic means positioned above and aligned with said tubulation;
a housing for slidably supporting said magnetic means;
a compression spring in said housing for resiliently mounting said magnet and normally urging said magnetic means downwardly; and
means rendered effective upon movement of an article into said work position for actuating said magnetic means to attract and hold one of said articles above said workholder.

12. In an apparatus for sealing an article having a paramagnetic tubulation extending from a casing by pinching off the tubulation at a workstation as set forth in claim 9, wherein said resiliently mounted means for attracting and holding said article includes:
a magnet positioned above and aligned with said tubulation;
a housing for slidably supporting said magnet;
a compression spring in said housing for resiliently mounting said magnet and normally urging said magnet downwardly;
said workholder has a plurality of vertical bores formed therein for receiving leads extending from said casing; and
means rendered effective following said pinching means sealing said tubulation for advancing said workholder through said workstation whereupon said tubulation is slidably moved along, and out of contact with, said magnet to release said article to drop onto said workholder.

13. In an apparatus for sealing a tubulation extending from and attached to each of a plurality of articles loosely supported in a rack advanced cyclically along a path into a workstation to position each of said articles in seriatim in said workstation;
means positioned at a spaced distance above the path of movement of the unattached ends of said tubulations and rendered effective upon movement of each article into registration therewith for attracting each of said tubulations in seriatim to partially withdraw each article from the rack;
means for resiliently mounting said attracting means;
means spanning the path of movement of the tubulation along the longitudinal axis thereof for sealing the tubulation;
means mounting said sealing means for movement into engagement with the tubulation to pinch off the tubulation held by said attracting means; and
means rendered effective between each cyclic advancement of said rack into said workstation for moving said sealing means toward each other to pinch the tubulation and elongate the tubulation linearly in opposed directions whereupon the attracting means is moved against said resilient mounting means and said articles recede toward said rack.

14. In an apparatus for sealing a paramagnetic tubulation extending from articles loosely supported in a rack which is advanced cyclically along a path into a workstation, as set forth in claim 13, wherein:
said means for attracting said tubulation comprises a magnet;
said means for resiliently mounting said magnet comprises a compression spring; and
said means for sealing the tubulation comprises a pair of opposed peens.

15. In an apparatus for pinch sealing paramagnetic tubulations extending from articles mounted loosely in a rack;
means for cyclically advancing said rack along a path;
a magnet positioned at a spaced distance from the path of movement of the ends of said tubulations, said spaced distance being selected so that the magnet will attract each tubulation and partially withdraw each article from the rack as said rack moves each tubulation into registration with said magnet;
means for resiliently supporting said magnet;
a pair of pinch rolls spanning the path of movement of the tubulation;
means mounting said pinch rolls for movement toward each other to pinch each tubulation held by said magnet; and
means rendered effective during the dwell between each cyclic advancement of said rack for moving said pinch rolls toward each other to pinch the tubulation whereupon axial expansion of said tubulation moves the magnet against said resilient supporting means and returns the article to the rack.

16. In an apparatus for sealing a device by pinching off a paramagnetic tubulation extending therefrom at a workstation;

a rack for supporting loosely a plurality of said devices;
a magnet at said workstation and spaced a predetermined distance above the unattached ends of said tubulations;
means for indexing said rack to advance said devices in seriatim into said workstation and in registration with said magnet whereupon said magnet attracts the tubulation and partially withdraws the device from the rack;
means resiliently supporting said magnet for biasing said magnet downwardly toward said rack;
a first peening member selectively positioned between said magnet and said rack;
a second peening member opposed to said first sealing member, said first and second sealing members on opposite sides of, and aligned with, said tubulation;
means mounting said first and second peening members for movement toward each other to pinch said tubulation held by said magnet off said rack at said workstation; and
means rendered effective by the indexing of a leading one of said tubulations into said workstation and in registration with said magnet for moving said peening members toward each other to pinch the tubulation and expand axially in opposite directions the material thereof whereupon an upward expansion of said material moves said magnet against said resilient mounting means and downward expansion moves the device toward the rack to be resupported thereon.

References Cited

UNITED STATES PATENTS

| | | | |
|---|---|---|---|
| 1,099,186 | 6/1914 | McKenna | 72—419 |
| 2,693,638 | 11/1954 | Anderson | 72—376 |
| 3,117,615 | 1/1964 | Graven | 72—416 |
| 2,495,533 | 1/1950 | Macklin et al. | 72—49 |

LOWELL A. LARSON, Primary Examiner

U.S. Cl. X.R.

72—419